United States Patent [19]

Suzuki et al.

[11] Patent Number: 5,015,834
[45] Date of Patent: May 14, 1991

[54] INFORMATION CARD SYSTEM COMMUNICABLE IN CONTACTLESS MANNER

[75] Inventors: Tadato Suzuki; Yoshikazu Yorimoto; Hidekazu Matsumura; Seiji Hirano, all of Tokyo, Japan

[73] Assignee: Toppan Printing Co., Ltd., Tokyo, Japan

[21] Appl. No.: 334,441

[22] Filed: Apr. 7, 1989

[30] Foreign Application Priority Data

| Apr. 8, 1988 [JP] | Japan | 63-86934 |
| May 30, 1988 [JP] | Japan | 63-134118 |
| May 30, 1988 [JP] | Japan | 63-134119 |

[51] Int. Cl.$^5$ ............................................. G06K 7/08
[52] U.S. Cl. ..................................... 235/493; 235/449
[58] Field of Search ... 364/200 MS File, 900 MS FIle; 235/449, 492, 493

[56] References Cited

U.S. PATENT DOCUMENTS

| 3,641,316 | 2/1972 | Dethloff et al. . | |
| 4,546,241 | 10/1985 | Walton . | |
| 4,605,844 | 8/1986 | Haggan . | |
| 4,605,845 | 8/1986 | Takeda . | |
| 4,720,626 | 1/1988 | Nishikawa et al. | 235/449 |
| 4,748,320 | 5/1988 | Yorimoto et al. . | |
| 4,791,285 | 12/1988 | Ohki . | |
| 4,795,898 | 1/1989 | Bernstein et al. . | |
| 4,797,541 | 1/1989 | Billings et al. . | |
| 4,798,322 | 1/1989 | Bernstein et al. | 235/492 |

*Primary Examiner*—Thomas M. Heckler
*Attorney, Agent, or Firm*—Burns, Doane, Swecker & Mathis

[57] ABSTRACT

An information card system according to the present invention establishes a data communication between a terminal unit and an information card after receipt of an acknowledge signal supplied from the information card to the terminal unit, and the acknowledge signal is produced by a combination of a periodical signal retrieving circuit and an output unit incorporated in the information card upon receiving a periodical signal fed from the terminal unit, so that a misfit between the information card and the terminal unit is detectable before the data communication.

24 Claims, 11 Drawing Sheets

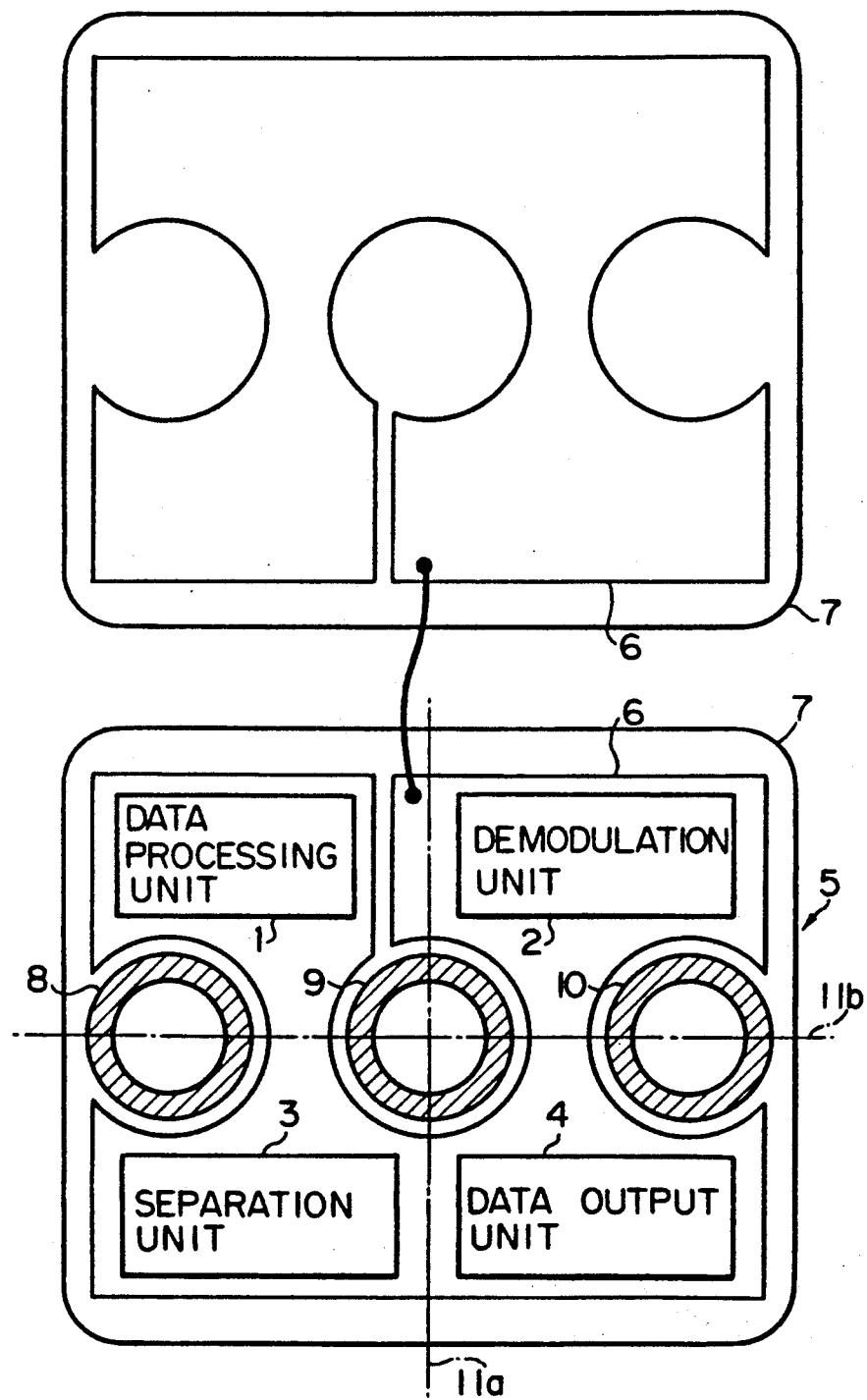

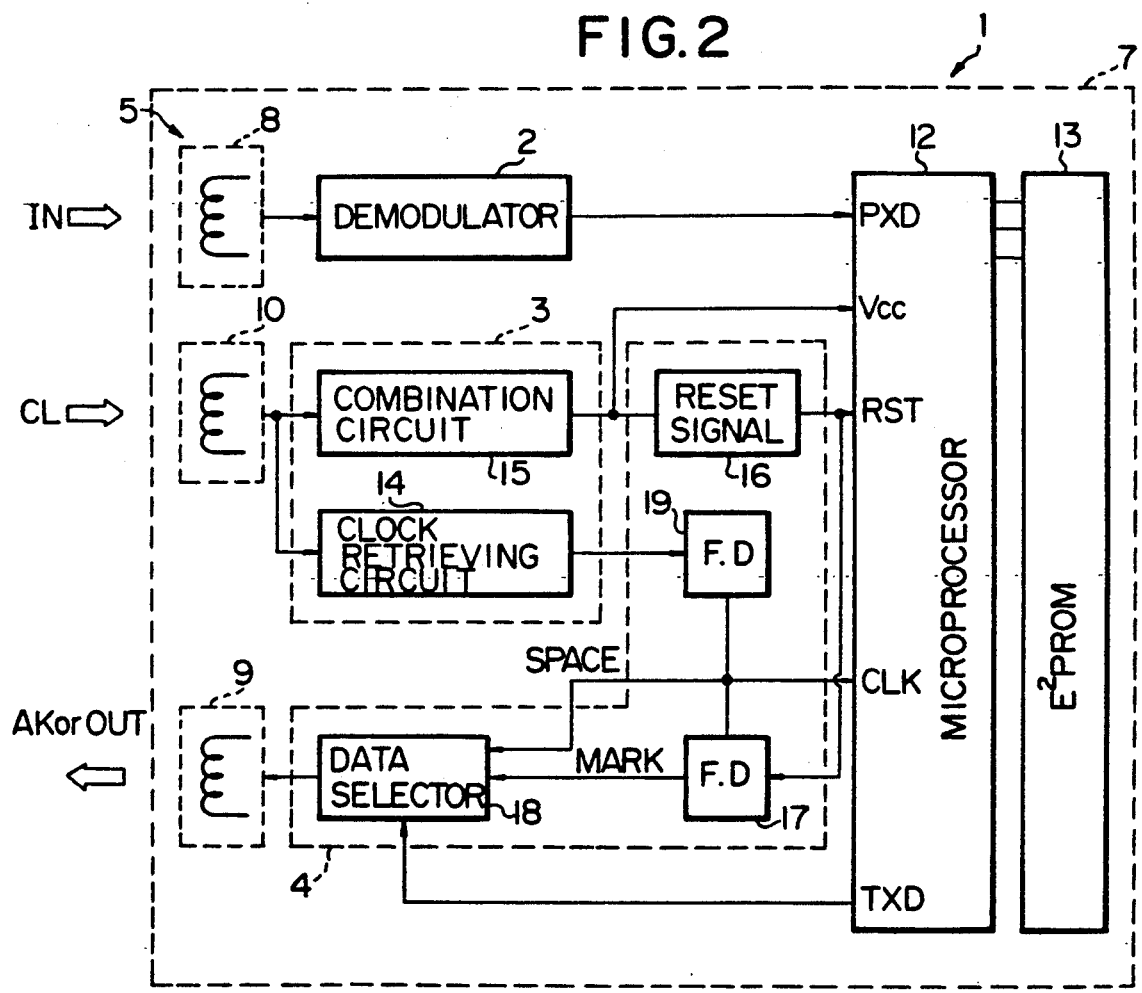

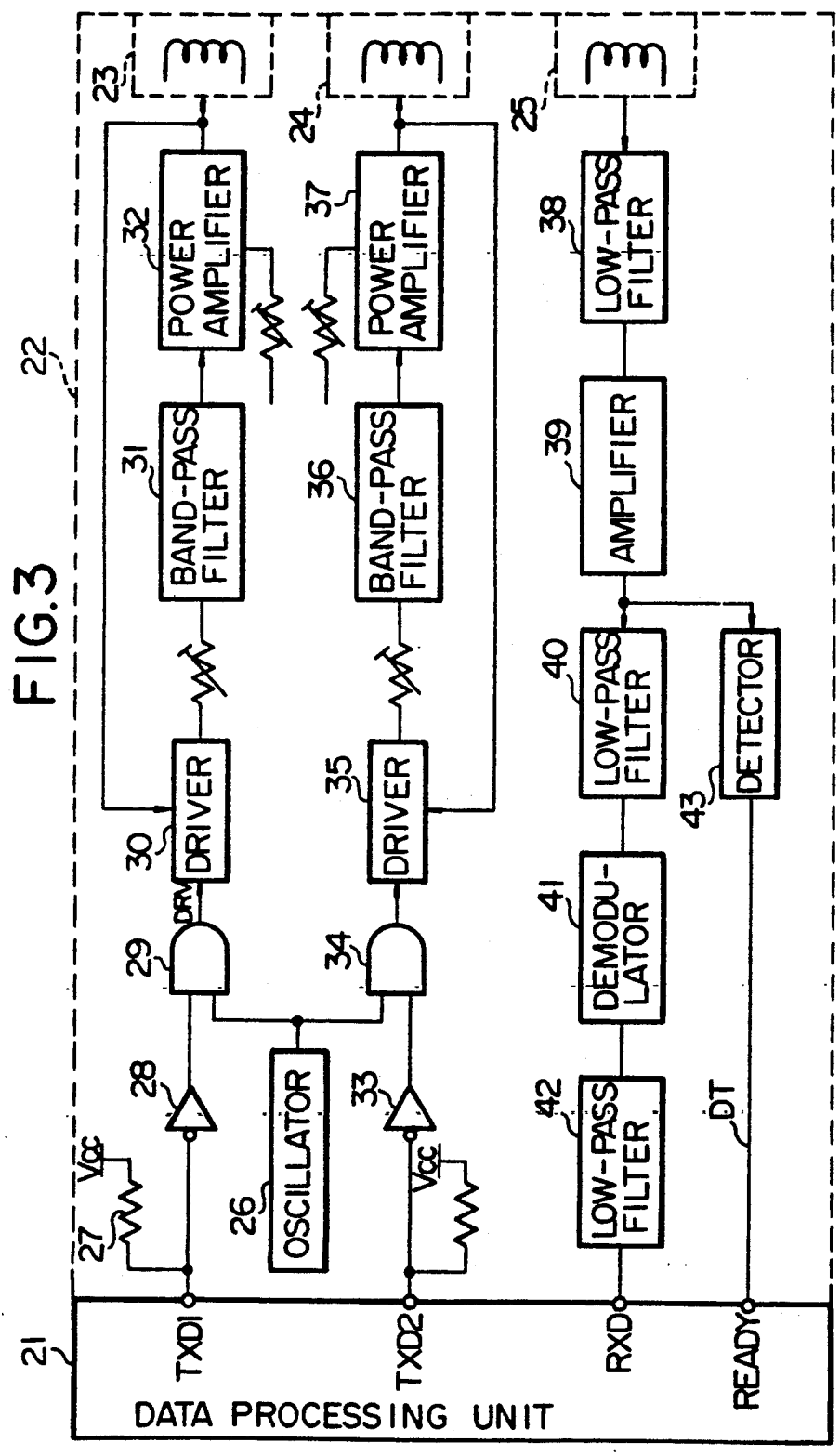

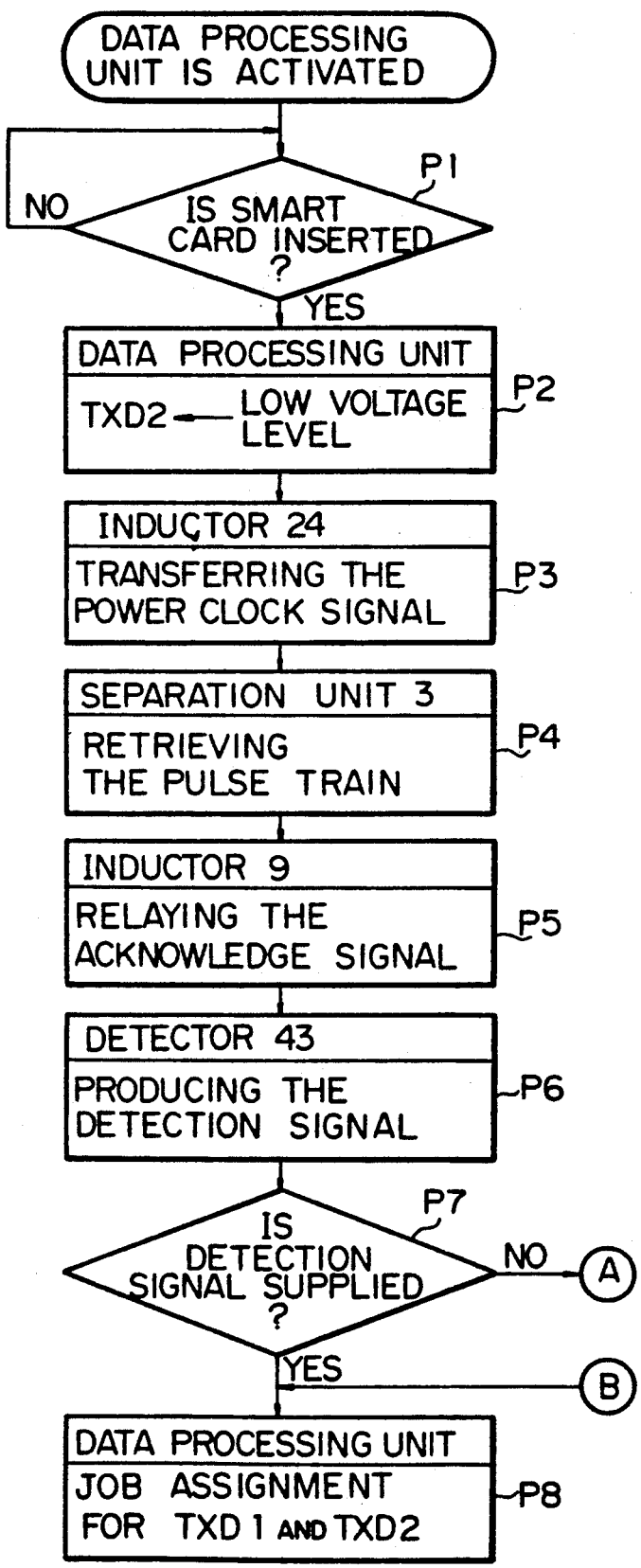

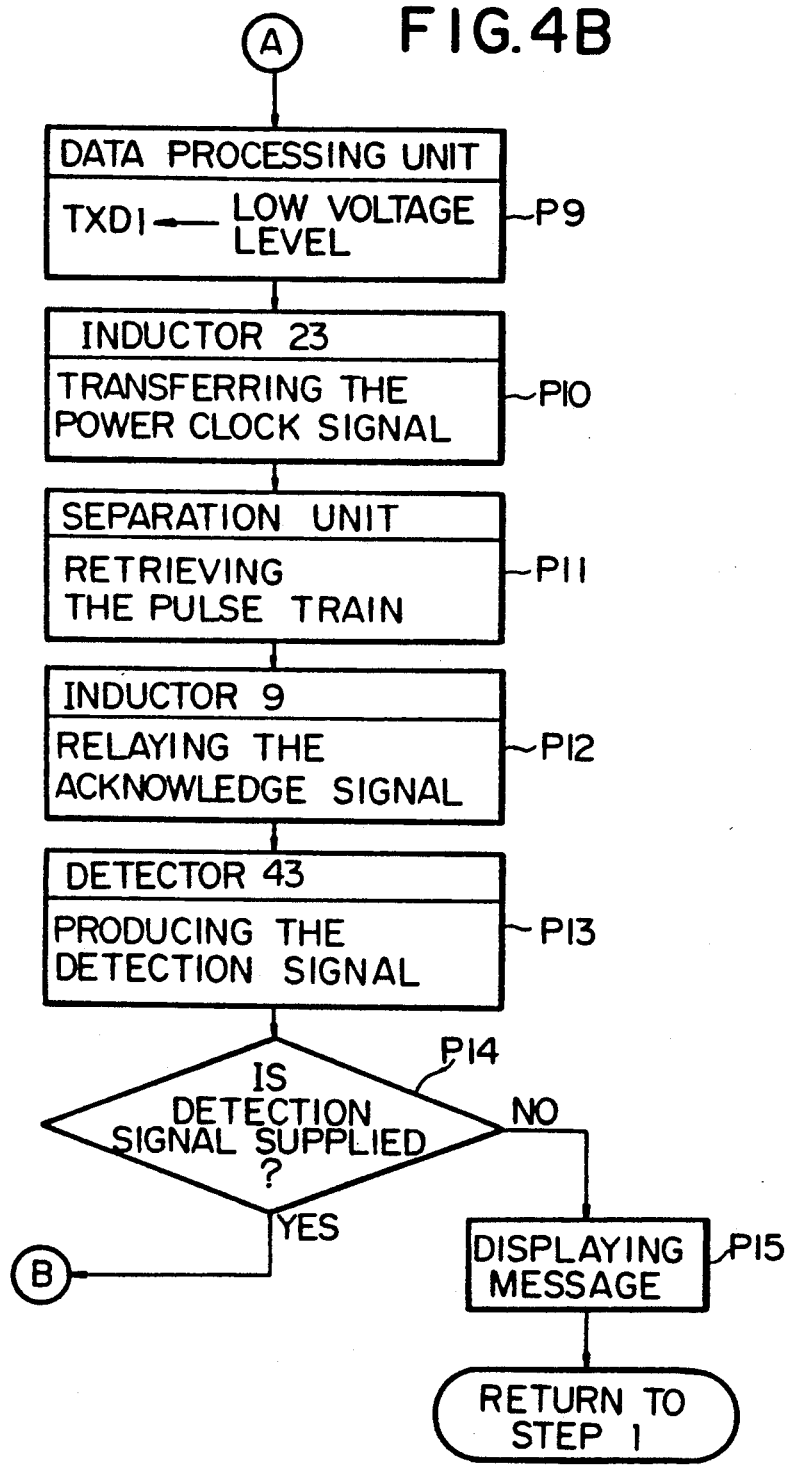

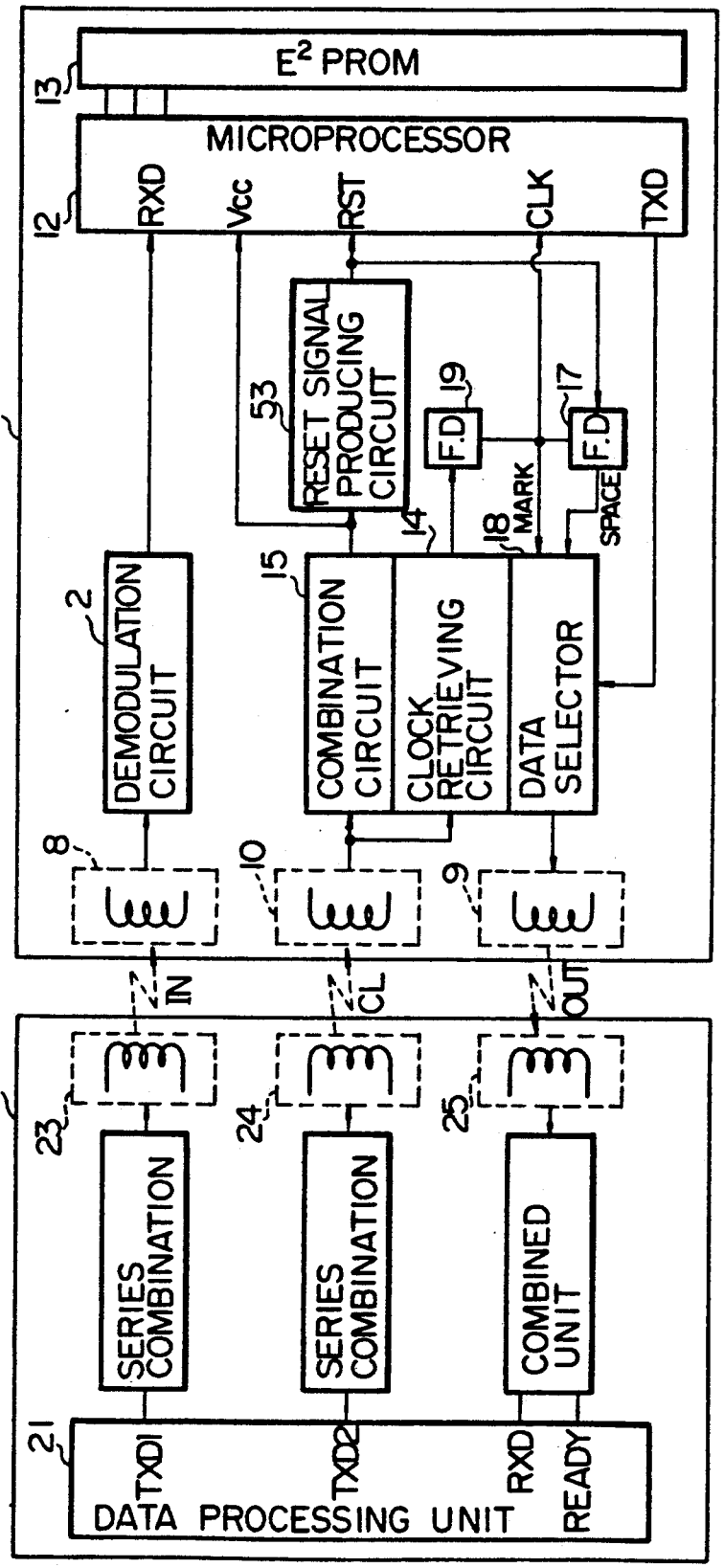

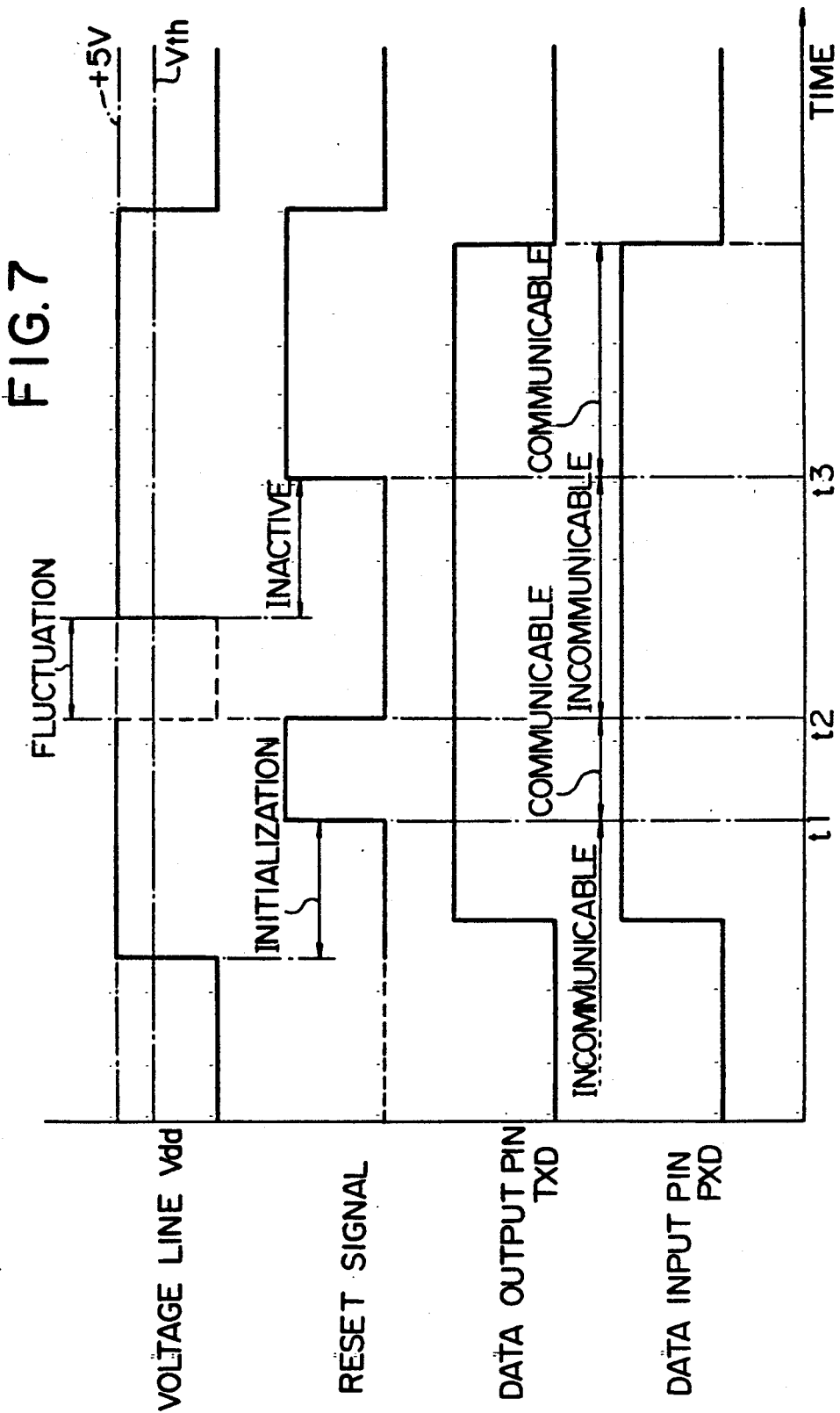

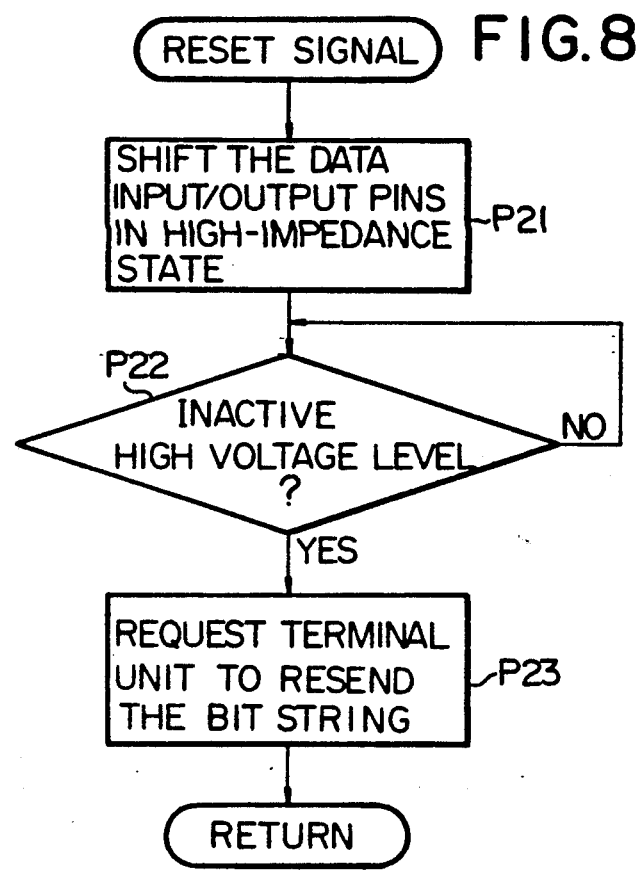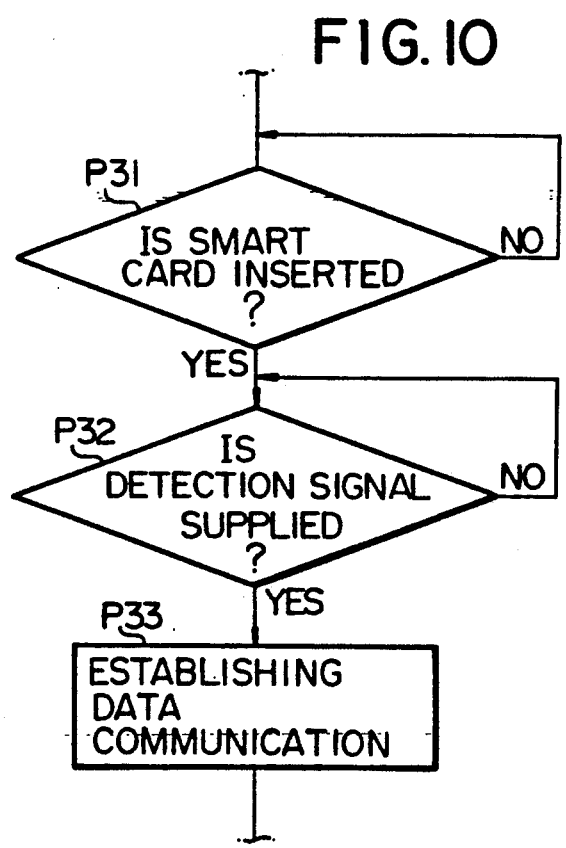

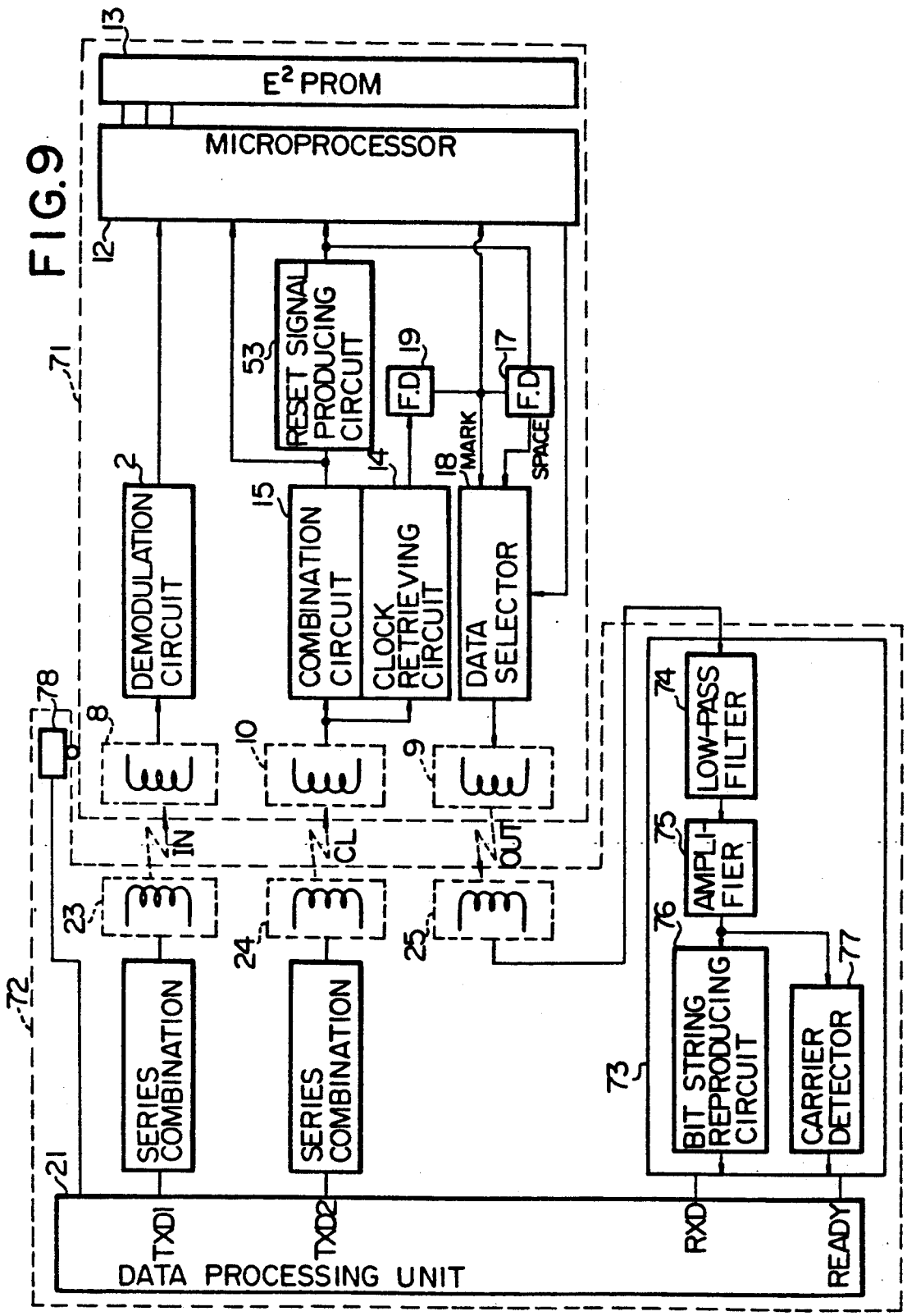

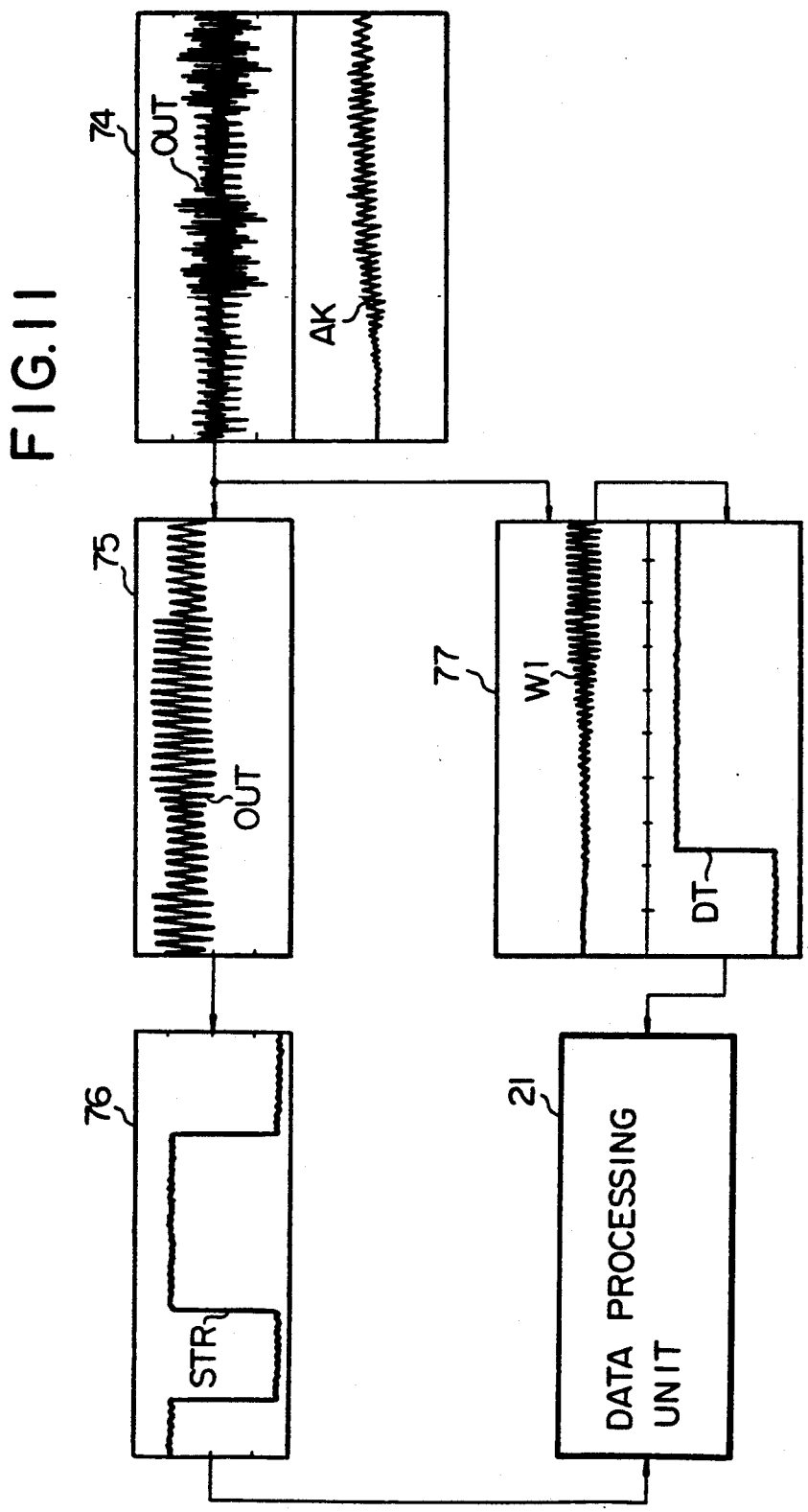

INFORMATION CARD SYSTEM COMMUNICABLE IN CONTACTLESS MANNER

FIELD OF THE INVENTION

This invention relates to an information card system and, more particularly, to a card-shaped information storage medium associated with a microprocessor which is communicable with a terminal unit in a contactless fashion.

DESCRIPTION OF THE RELATED ART

In general, the information card is used for memorizing pieces of information in a memory provided in association with a microprocessor and, for this reason, needs to establish communication with a terminal unit of an external computer system. Some of the information cards are respectively provided with plural sets of connectors which are brought into physical contact with corresponding connectors incorporated in the terminal unit for data communication as well as power supplies. However, various problems are encountered in the information card provided with the connectors. One of the problems inherent in the information card of the physical contact type is communicative errors and, accordingly, incorrect data information produced for storing the $E^2PROM$ due to a misfit between the connectors.

In order to overcome the problems inherent in the information card of the physical contact type, an information card of a contactless type is proposed. For establishing the data communication as well as the power supply, the electromagnetic induction is applied to the contactless communication. Namely, the contactless information card is provided with three inductors one of which is provided for the power supply from an external source and the others of which are used for establishing the data communication. Off course, the terminal unit also has three inductors which are respectively paired with the inductors of the information card in the contactless fashion. The information card of the contactless communication type is less liable to encounter the problem in the communicative errors, however, the communicative errors are not negligible due to mis-alignment between the inductors.

Moreover, another problem is encountered in the contactless information card in mis-insertion into the terminal unit. This is because of the fact that the three inductors are respectively dedicated to the predetermined purposes, i. e., the power supply, the data output and the data input. If each inductor thus dedicated to the predetermined purpose is coupled to the inductor for a different purpose, the information card is usually deactivated from a new data processing upon the insertion into the terminal unit, and the user needs to repeat the insertion from the opposite edge. This is inconvenient to the user, so that a bi-directional information card is proposed in Japanese Patent Application laid-open (Kokai) No. 63-18489.

The bi-directional information card disclosed in the above mentioned Japanese Patent Application laid-open has three inductors arranged in a symmetrical configuration, and an insertion from either edge is, accordingly, acceptable to the terminal unit. Namely, the inductor for the power supply is located on the symmetric line, and the inductors for the data communication are provided on both sides of the symmetric line. The two inductors for the data communication are coupled to a switching circuit which is responsive to a control signal for steering the input and output signals. When the information card is inserted from one edge thereof into the terminal unit, an input data signal is supplied from the terminal unit to one of the inductors for the data communication, so that the insertion from the one edge is detected by a controller. If, on the other hand, the information card is inserted from the other edge into the terminal unit, the other inductor is supplied with the input data signal, and, accordingly, the controller decides that the information card is inserted in the opposite direction.

The symmetrical arrangement enhances the operability of the information card, however, still another problem is encountered in the prior art bi-directional information card in that unintended behaviors are liable to take place in the microprocessor and, accordingly, the memory associated therewith. In detail, if the information card is inserted into the terminal unit in the direction allowing one of the inductors to receive the input signal in the situation where the other inductor is expected to receive the input signal, the input signal is initially supplied from the other inductor to an output buffer of the microprocessor, and there is a possibility of conducting the input signal into the semiconductor substrate of the microprocessor depending upon the state of the output buffer. This results in the fluctuation of voltage level at the semiconductor substrate which in turn is causative of undesirable switching operations of the component transistors of the microprocessor due to the back-gate biasing effect. The undesirable switching operations produce the unintended circuit behaviors of the microprocessor, and the pieces of information stored in the memory may be destroyed at the worst.

SUMMARY OF THE INVENTION

It is therefore an important object of the present invention to provide an information card which is free from the communicative errors.

It is also another important object of the present invention to provide an information card which is bi-directional upon the insertion.

It is still another important object of the present invention to provide a bi-directional information card which is free from unintended circuit behaviors of the microprocessor.

To accomplish these objects, the present invention proposes to produce an acknowledge signal outside the microprocessor when a pulse train is retrieved in the information card.

In accordance with one aspect of the present invention, there is provided an information card system comprising: a) an information card having a-1) at least first, second and third inductors respectively assigned to an input signal, a periodical signal and an output signal, a-2) a first data processing unit operative to execute program sequences for producing a plurality of output data signals after an initialization, a-3) a non-volatile memory unit associated with the first data processing unit and operative to memorize pieces of data information each represented by one of the output data signals, a-4) a first demodulation unit coupled between the first inductor and the first data processing unit and operative to extract a bit string indicative of a piece of input data information from the input signal, a-5) a separation unit coupled between the second inductor and the first data processing unit and operative to extract a pulse train from the periodical signal and to produce an electric power on the basis of the periodical signal, and a-6) an output unit coupled at an input node thereof to the separation unit and at an control node thereof to the first data processing unit and producing a data output signal in the presence of another output data signal fed from the first data processing unit, the output unit further producing an acknowledge signal in the initialization for transferring to the third inductor as the output signal; and b) a terminal unit communicable with the information card having b-1) at least fourth, fifth and sixth inductors capable of respectively facing the first, second and third inductors or the third, second and first inductors in a contactless fashion, b-2) a second data processing unit, b-3) two series combination circuits coupled in parallel between the second data processing unit and the fourth and sixth inductors and operative to produce the input signal and the periodical signal, respectively, depending upon a job assignment decided by the second data processing unit, and b-4) a combined unit coupled between the fifth inductor and the second data processing unit and operative to relay the output signal to the second data processor and to produce a detection signal indicative of whether or not the acknowledge signal is supplied thereto, wherein the second data processing unit allows one of the two series combination circuits to produce the input signal after receiving the detecting signal indicative of a presence of the acknowledge signal.

In accordance with another aspect of the present invention, there is provided an information card associated with a terminal unit having at least three inductors two of which are respectively assigned to an input signal and a periodical signal depending upon a job assignment and the other of which is selectively supplied with an acknowledge signal and a data output signal, the terminal unit establishing a data communication for the input signal and the output data signal after a receipt of the acknowledge signal, and the information card comprises a) at least first, second and third inductors capable of facing the at least three inductors, respectively, and assigned to the input signal, the periodical signal and an output signal consisting of the acknowledge signal and the data output signal, b) a first data processing unit operative to execute program sequences for producing a plurality of output data signals after an initialization, c) a non-volatile memory unit associated with the first data processing unit and operative to memorize pieces of data information each represented by one of the output data signals, d) a first demodulation unit coupled between the first inductor and the first data processing unit and operative to extract a bit string indicative of a piece of input data information from the input signal, e) a separation unit coupled between the second inductor and the first data processing unit and operative to extract a pulse train from the periodical signal and to produce an electric power on the basis of the periodical signal, and f) an output unit coupled at an input node thereof to the separation unit and at an control node thereof to the first data processing unit and producing a data output signal in the presence of another output data signal fed from the first data processing unit, the output unit further producing the acknowledge signal in the initialization for transferring to the third inductor as the output signal.

In accordance with still another aspect of the present invention, there is provided a terminal unit communicable with an information card having at least first, second and third inductors respectively assigned to an input signal, a periodical signal and an output signal, a first data processing unit operative to execute program sequences for producing a plurality of output data signals after an initialization, a non-volatile memory unit associated with the first data processing unit and operative to memorize pieces of data information each represented by one of the output data signals, a first demodulation unit coupled between the first inductor and the first data processing unit and operative to extract a bit string indicative of a piece of input data information from the input signal, a separation unit coupled between the second inductor and the first data processing unit and operative to extract a pulse train from the periodical signal and to produce an electric power on the basis of the periodical signal, an output unit coupled at an input node thereof to the separation unit and at an control node thereof to the first data processing unit and producing a data output signal in the presence of another output data signal fed from the first data processing unit, the output unit further producing an acknowledge signal in the initialization for transferring to the third inductor as the output signal, and the terminal unit comprises a) at least fourth, fifth and sixth inductors capable of respectively facing the first, second and third inductors or the third, second and first inductors in a contactless fashion, b) a second data processing unit, c) two series combination circuits coupled in parallel between the second data processing unit and the fourth and sixth inductors and operative to produce the input signal and the periodical signal, respectively, depending upon a job assignment decided by the second data processing unit, and d) a combined unit coupled between the fifth inductor and the second data processing unit and operative to relay the output signal to the second data processor and to produce a detection signal indicative of whether or not the acknowledge signal is supplied thereto, wherein the second data processing unit allows one of the two series combination circuits to produce the input signal after receiving the detecting signal indicative of a presence of the acknowledge signal.

The job assignment is previously fixed by the second data processing unit in one implementation, however, the job assignment is changeable between the two series combination circuits and decided after the receipt of the detecting signal in another implementation.

BRIEF DESCRIPTION OF THE DRAWINGS

The features and advantages of an information card system according to the present invention will be more clearly understood from the following description taken in conjunction with the accompanying drawings in which:

FIG. 1 is a plan view showing, in a disassembled state, a bi-directional information card embodying the present invention;

FIG. 2 is a block diagram showing the circuit arrangement of the bi-directional information card shown in FIG. 1;

FIG. 3 is, a block diagram showing the circuit arrangement of an input-and-output facility incorporated in a terminal unit communicable with the information card shown in FIG. 1;

FIGS. 4A and 4B are flowcharts showing the sequence for assignment of inductors to a power input signal and a power periodical signal, respectively;

FIG. 5 is a block diagram showing the circuit arrangement of another information card system embodying the present invention;

FIG. 7 is a diagram showing the waveforms of essential signals produced in association with the circuit behavior of the reset signal producing circuit shown in FIG. 6;

FIG. 8 is a flowchart showing the program sequence executed by the microprocessor incorporated in the information card system shown in FIG. 5;

FIG. 9 is a block diagram showing the circuit arrangement of still another information card system embodying the present invention;

FIG. 10 is a flowchart showing a part of the program sequence executed by the data processing unit incorporated in the terminal unit shown in FIG. 9; and FIG. 11 is a block diagram showing the waveforms of essential signals produced in the terminal unit shown in FIG. 9.

DESCRIPTION OF THE PREFERRED EMBODIMENTS

First embodiment

Figure 6:
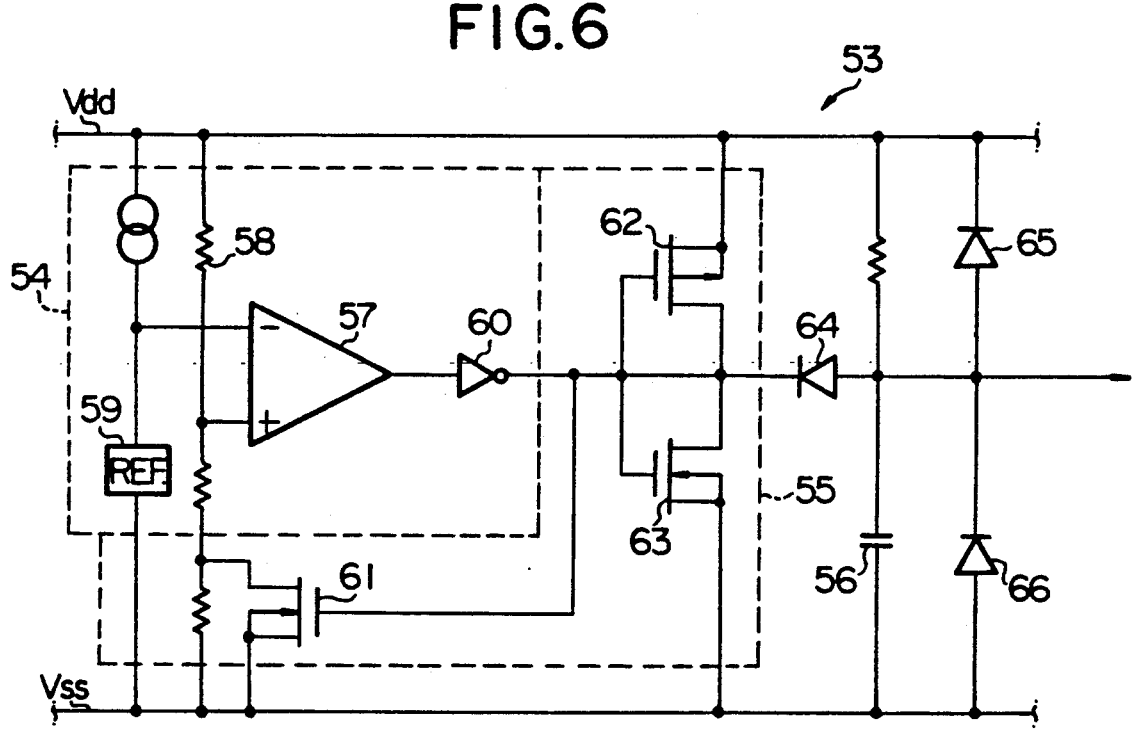
FIG. 6 is a circuit diagram showing the arrangement of the reset signal producing circuit incorporated in the information card shown in FIG. 5.

Referring first to FIG. 1 of the drawings, an information card according to the present invention largely comprises a data processing unit 1, a demodulation unit 2 for extraction of an input data signal from a power input data signal, a separation unit 3 for a pulse train and an electric power, a data output unit 4 and an input-and-output-facility 5, and all of the component units 1 to 4 are arranged on a flexible circuit board (not shown). The flexible circuit board are sandwiched between a pair of electromagnetic shield plates 6 for preventing the component units 1 to 4 from undesirable noises and housed in a card-shaped package 7. In this instance, the input-and-output facility 5 is formed with three inductors or coil members 8, 9 and 10 which are located in hollow spaces formed in the electromagnetic shield plates 6, respectively. The card-shaped package 7 has symmetric lines 11a and 11b intersecting each other, and the inductor 9 has a center axis perpendicularly merged with the intersecting point of the symmetric lines 11a and 11b. However, the inductors 8 and 10 have respective center axes perpendicularly merged with the symmetric line 11b, and the inductors 8 and 10 are arranged to be symmetrical with respect to the symmetric line 11a. Both of the inductors 8 and 10 are space apart from the respective side edges of the package 7 by respective distances approximately equal to one another, and, by virtue of this symmetrical arrangement, the information card shown in FIG. 1 is classified into the bi-directional type.

Turning to FIG. 2, the data processing unit 1 has a microprocessor 12 and an electrically erasable and programmable read only memory 13 (which is hereinunder abbreviated as "E²PROM"), and pieces of data information stored in the E²PROM 13 are accessible through the microprocessor 12. As described hereinlater in detail, the microprocessor 12 executes an initialization program routine after a power-on event and, then, various program routine for producing output data signals.

Between the input-and-output facility 5 and the microprocessor 12 are provided the demodulation unit 2, the separation unit 3 and the data output unit 4 which are coupled to the inductors 8, 10 and 9, respectively.

The inductor 9 is dedicated to a data output signal OUT as well as an acknowledge signal AK, and the power input data signal IN and a power periodical signal CL are supplied to the inductors 8 and 10, respectively. The demodulation unit 2 retrieves a bit string representative of a piece of input data information from the power input data signal IN, and the bit string is supplied to a data input pin RXD of the microprocessor 12.

The separation unit 3 comprises a demodulation unit or a periodical signal retrieving circuit 14 and a combination circuit 15 of a rectifier and a smoothing circuit, and the power periodical signal CL is supplied in parallel to both of the periodical signal retrieving circuit 14 and the combination circuit 15. The combination circuit 15 rectifies the power periodical signal CL and stably supplies the power supply pin Vcc of the microprocessor 12 with a certain dc constant voltage of, for example, about 5 volts. The constant voltage is further supplied to a reset signal producing circuit 16 for producing a power-on reset signal of an active low voltage level, and the power-on reset signal is applied to the reset pin RST of the microprocessor 12 for the execution of the initialization program routine as well as a frequency divider 17. The reset signal producing circuit 16 may be implemented by a one-shot multivibrator. The frequency divider 17 is deactivated in the presence of the reset signal.

The periodical signal retrieving circuit 14 is operative to extract a raw pulse train from the power periodical signal CL which is supplied to a frequency divider 19 which doubles the pulse width of the raw pulse train, thereby producing a system clock signal supplied to a clock pin CLK of the microprocessor 12. The system clock signal is further supplied to the data selector 18 and serves as space impulses SPACE. The system clock signal is also supplied to the frequency demodulator 17 for doubling the pulse width again, and the system clock signal with the double pulse width serves as the mark impulses MARK. The data selector 18 has two input nodes coupled in parallel to the frequency dividers 17 and 19 and is responsive to a bit string fed from a data output pin TXD, and the bit string fed from the data output pin TXD is representative of a piece of output data information. In detail, the data selector 18 is transparent to the space impulses SPACE in the presence of the data bit of logic "0" level, however, the mark impulses MARK are transferred to the inductor 9 in the presence of the data bit of logic "1" level. Whenever no bit string appears at the data output pin TXD, the space impulses SPACE are transferred to the inductor 9, and the continuous space impulses SPACE serve as an knowledge signal AK. However, the mark impulses MARK mixed with the space impulses SPACE are indicative of the piece of output data information and, accordingly, serve as an output data signal OUT. In the instance, the reset signal producing circuit 16, the frequency dividers 17 and 19 and a data selector 18 as a whole constitute an output unit.

Arrangement of terminal unit

Turning to FIG. 3 of the drawings, a terminal unit communicable with the information card shown in FIG. 2 largely comprises a data processing unit 21 and an input-and-output facility 22. Though not shown in the drawings, the terminal unit further comprises a display window for a message and a sensor unit which detects the information card upon insertion. The data processing unit 21 has at least two data output pins TXD1 and TXD2, at least one data input pin RXD and a ready pin READY, and the input-and-output facility 22 contains three inductors or coil members 23, 24 and 25. The inductor 25 is located at a center area, and the other inductors 23 and 24 are arranged in symmetric manner with respect to the inductor 25, so that the inductors 8, 9 and 10 are confronted with the inductors 23, 25 and 24 upon insertion of the information card in one direction. However, when the information card is inserted into the terminal unit in the opposite direction, the inductors 8, 9 and 10 confront the inductors 24, 25 and 23, respectively.

Between the two data output pins TXD1 and TXD2 and the inductors 23 and 24 are coupled two series combinations one of which is used for producing the power input data signal IN and the other of which is operative to merge a clock train into a positive voltage level for preparation of the power periodical signal CL. An oscillator such as, for example, a crystal oscillator 26 is shared by the two series combinations for providing the clock train to both of the series combinations. One of the series combinations comprises a pull-up resistor 27 coupled between a source of positive voltage level Vcc and the data output pin TXD1, an inverter circuit 28 coupled at the input node thereof to the data output pin TXD1, an AND gate 29 coupled at one input node thereof to the output node of the inverter circuit 28 and at the other input node thereof to the oscillator 26, and a booster circuit coupled between the AND gate 29 and the inductor 23, and the booster circuit is implemented by a feedback loop having a driver circuit 30, a band-pass filter circuit 31 and a power amplifier circuit 32. The AND gate 29 is responsive to the logic level fed from the inverter circuit 28 and, accordingly, to the voltage level at the data output pin TXD1, and operative to produce a driving signal DRV in synchronous with the clock train fed from the oscillator 26. Assuming now that the positive high voltage level is tantamount to logic "1" level, the AND gate 29 is transparent to the clock train fed from the oscillator 26 with the low voltage level at the data output pin TXD1, however, if the data output pin TXD1 has the positive high voltage level, the AND gate 29 blocks the clock train fed from the oscillator 26. With the driving signal DRV, the driver circuit 30 cooperates with the power amplifier circuit 32 to produce the power input data signal IN or the power periodical signal CL. The band-pass filter circuit 31 is provided for a shaping use.

The other series combination is similar in circuit arrangement to the series combination described hereinbefore, and, for this reason, the component circuits corresponding to the circuits 28 to 32 are respectively designated by reference numerals 33 to 37, however, no further description is incorporated for the sake of simplicity.

The two series combinations are thus similar in circuit arrangement to one another, so that either series combination can produce the power input data signal IN, or the power periodical signal CL, depending upon a job assignment or a decision made by the data processing unit 21. Namely, when the data procession unit 21 decides to provide a bit string representative of a piece of data information to the data output pin TXD1, the series combination coupled thereto is operative to produce the power input data signal IN, and the other series combination is used for production of the power periodical signal CL in the presence of the low voltage level at the data output pin TXD2. However, if the data processing unit 21 decides to change the job assignment between the series combinations, the bit string takes place at the data output pin TXD2, and the other data output pin TXD1 is allowed to go down to the low voltage level.

Between the data input pin RXD and the inductor 25 is further provided still another series combination which comprises a low-pass filter circuit 38, an amplifier circuit 39, a low-pass filter circuit 40, a demodulation circuit 41 and a low-pass filter circuit 42. The low-pass filter circuits 38, 40 and 42 are mainly provided for shaping the waveform. A detector circuit 43 is coupled between the amplifier circuit 39 and the ready pin READY for detecting the direction of an insertion. Namely, as described in connection with the data selector circuit 18 of the information card, when the power periodical signal CL is supplied to the inductor 10, the data selector circuit 18 transfers the mark impulses to the inductor 9 which in turn transfers the mark impulses to the inductor 25 in the contactless fashion. However, no space impulse is mixed into the mark impulses, because the microprocessor 12 is supplied with the reset signal and, accordingly, executes an initialization program routine. The mark impulses are shaped by the low-pass filter circuit 38 for elimination of undesirable spikes and, thereafter, amplified in magnitude, then being supplied to the detector circuit 43. The detector circuit 43 is responsive to the acknowledge signal AK and produces a detection signal DT of the active low voltage level which is fed to the ready pin READY. If the information card is inserted into the terminal unit in the above mentioned one direction, the inductors 9 and 25 are faced to each other, and the acknowledge signal AK is detectable by the detector circuit 43. However, when the information card is inserted in the opposite direction, the power periodical signal CL is transferred from the inductor 24 to the inductor 8, and, for this reason, no acknowledge signal AK is detected by the detector circuit 18. Thus, the detection of the acknowledge signal Ak depends on the direction of the insertion, then the data processing unit 21 checks on the ready pin READY to see whether or not the information card is inserted in the above mentioned one direction. In this instance, the above mentioned another series combination and the detector circuit 43 form in combination a combined unit.

Sequence of behaviors

Description is hereinunder made for the operations achieved by the data processing unit 21, the microprocessor 12 as well as the component circuits with reference to FIGS. 4A and 4B. The flowchart illustrated in FIGS. 4A and 4B is provided with a plurality of steps each represented by a block, and some blocks describe not only a particular behavior but also the component part where the particular behavior is achieved.

When the data processing unit 21 is activated, the data processing unit 21 periodically checks on the sensor to see whether or not the information card is inserted into the terminal unit as by step P1. If no information card is detected by the sensor, the data processing unit 21 repeats the execution of the step P1 until the answer to the decision step P1 is given in the positive. When the information card is inserted into the terminal unit in either direction, the sensor reports the detection of the insertion to the data processing unit 21. With the report from the sensor, the answer to the decision step P1 is given in the positive, so that the data processing unit 21 allows the data output pin TXD2 to go down to the low voltage level as by step P2. The continuous high voltage level is then supplied from the inverter circuit 33 to the AND gate 34, and the AND gate 34 becomes transparent for the pulse train fed from the oscillator 26. With the pulse train serving as the driving signal DRV, the booster circuit produces the power periodical signal CL, and the power periodical signal CL is supplied to the inductor 24 as by step P3.

If the information card is inserted into the terminal unit in the above mentioned one direction, the power periodical signal CL is transferred from the inductor 24 to the inductor 10 which in turn transfers the power periodical signal CL to the separation unit 3. When the power periodical signal CL is supplied to the separation unit 3, the separation unit 3 retrieves the row pulse train from the power periodical signal CL as by step P4, and the acknowledge signal AK is, then, supplied from the data output unit 4 to the inductor 9, because no bit string is produced in the initialization program routine. The acknowledge signal AK is relayed to the inductor 25 as by step P5. However, when the information cart is inserted into the terminal unit in the opposite direction, no acknowledge signal AK is produced and, accordingly, relayed to the inductor 25 even if the steps P4 and P5 are executed.

At step P6, the detector circuit 43 tries to produce the detection signal. When the information card is inserted into the terminal unit in the above mentioned one direction, the acknowledge signal AK is detected by the detector circuit 43, and, for this reason, the detection signal is supplied to the ready pin READY of the data processing unit 21. On the other hand, in the case where the information card is inserted in the opposite direction, no acknowledge signal AK and, accordingly, no detection signal is supplied to the ready pin READY. After the execution of the step P2, the data processing unit 21 periodically checks on the ready pin READY to see whether or not the detection signal is supplied thereto as by step P7. If the answer to the decision step P7 is given in the positive, the data processing unit 21 confirms the above mentions one direction and, accordingly, assigns the production of the power periodical signal to the series combination coupled to the data output pin TXD2. As a result, the data output pin TXD1 is used for the delivery of the bit string of data information as by step P8.

On the other hand, if the data processing unit 21 finds that no detection signal is supplied to the ready pin READY, the answer to the decision step P7 is given in the negative, so that the data processing unit 21 proceeds to step P9 to allow the data output pin TXD1 to go down to the low voltage level. Off course, the data output pin TXD2 is recovered to the positive high voltage level. The alternation in voltage level results in that the AND gate 29 becomes transparent for the pulse train fed from the oscillator 26, however, the AND gate 34 blocks the pulse train. With the pulse train serving as the driving signal DRV, the booster circuit produces the power periodical signal CL, and the power periodical signal CL is supplied to the inductor 23 as by step P10.

If the information card is inserted into the terminal unit in the opposite direction, the power periodical signal CL is transferred from the inductor 23 to the inductor 10 which in turn transfers the power periodical signal CL to the separation unit 3. When the power periodical signal CL is supplied to the separation unit 3, the separation unit 3 retrieves the pulse train from the power periodical signal CL as by step P11, and the reset signal is supplied to the microprocessor 12. With the reset signal, the microprocessor 12 executes the initialization program routine, and, accordingly, no bit string is supplied to the data output pin TXD. In this situation, the acknowledge signal AK is, then, supplied from the data output unit 4 to the inductor 9. The acknowledge signal AK is relayed to the inductor 25 as by step P12. However, when the information cart is incompletely inserted into the terminal unit, no acknowledge signal AK is produced and, accordingly, relayed to the inductor 25 even if the steps P11 and P12 are executed.

At step P13, the detector circuit 43 tries to produce the detection signal. When the information card is inserted into the terminal unit in the opposite direction, the acknowledge signal AK is detected by the detector circuit 43, and, for this reason, the detection signal is supplied to the ready pin READY of the data processing unit 21. On the other hand, in the case where the information card is incompletely inserted into the terminal unit, no acknowledge signal AK and, accordingly, no detection signal is supplied to the ready pin READY. After the execution of the step P9, the data processing unit 21 periodically checks on the ready pin READY to see whether or not the detection signal DT is supplied thereto as by step P14. If the answer to the decision step P14 is given in the positive, the data processing unit 21 confirms the opposite direction and, accordingly, returns to the step P8. However, the data processing unit 21 assigns the production of the power periodical signal to the series combination coupled to the data output pin TXD1, and the data output pin TXD2 is used for the delivery of the bit string of data information. On the other hand, if the answer to the decision step P14 is given in the negative, the data processing unit 21 decides that the information card is incompletely inserted into the terminal unit and, accordingly, display a message on the display window as by step P15. The message may be "Try again". After displaying the message, the data processing unit 21 returns to the step P1 for repeating the loop consisting of the step P1 and P15. The information card system thus arrange establishes the data communication after the receipt of the detection signal, and, for this reason, the system is free from any communicative errors due to the mis-alignment or misfit between the inductors.

As will be understood from the above description, no communicative error takes place in the information card system according to the present invention, so that the information card system is reliable with respect to those of the physical contact type and of the contactless type. Moreover, the combination of the information card and the terminal unit according to the present invention is advantageous over the prior art bi-directional information card in that the undesirable misoperation hardly takes place in the microprocessor incorporated therein. This is because of the fact that the direction is detectable without application of any signal to the microprocessor.

Second embodiment

Turning to FIG. 5 of the drawings, another information card system embodying the present invention largely comprises an information card 51 and a terminal unit 52. The terminal unit 52 is similar in circuit arrangement to the terminal unit shown in FIG. 3, however, the two series combinations are fixedly dedicated to the production of the power input data signal and the power periodical signal, respectively. For the sake of simplicity, corresponding component units are designated by like reference numerals without any detailed description. The information card 51 is also similar in circuit arrangement to that illustrated in FIG. 2 except for a reset signal producing circuit 53, so that description will be hereinunder focused upon the reset signal producing circuit 53 with reference to FIG. 6 of the drawings.

Referring to FIG. 6, the reseting signal producing circuit 53 is coupled between two voltage lines Vdd and Vss and largely comprises a voltage fluctuation detector 54, a reset signal generator 55 and an absorber 56 which is formed by a capacitor in this instance. The voltage fluctuation detector 54 has a operational amplifier 57 coupled at a non-inverted node thereof to a voltage divider 58 and at an inverted node thereof to a reference voltage source 59, and an inverter circuit 60 is coupled to the output node of the operational amplifier 57. The reset signal generator 55 has an n-channel type field effect transistor 61 coupled in parallel to a part of the voltage divider 58, and a complementary inverter circuit consisting of a p-channel type field effect transistor 62 and an n-channel type field effect transistor 63, and the complementary inverter circuit is coupled at the input node thereof to the output node of the inverter circuit 60 and at the output node thereof to a diode network consisting of diodes 64, 65 and 66. The diode network aims at preventing the reset pin of the microprocessor 12 from undesirable noises together with the absorber 56.

Description will hereinunder made for operation of the information card system with reference to FIG. 7. When the power periodical signal is initially supplied to the combination circuit 15, the positive constant voltage level of about 5 volts is produced by the combination circuit 15 and, accordingly, the voltage line Vdd is increased in voltage level. When the voltage line Vdd exceeds a threshold voltage level Vth of the operational amplifier 57 and reaches the positive certain voltage level, the operational amplifier 57 shifts the output voltage into the high voltage level (at time t1), so that the n-channel type field effect transistors 61 and 63 turn off with the inverse of the output voltage of the operational amplifier 57, however, the p-channel type field effect transistor 62 turns on to prohibit a rest signal of active low voltage level from production. Prior to the time t1, the microprocessor 12 executes an initialization program routine, so that the information card 51 can not establish any communication with the terminal unit 52 until the initialization program routine is completed.

Assuming now that some turbulence takes place at time t2 and, accordingly, the voltage line Vdd fluctuates in voltage level, the operational amplifier 57 shifts the output voltage level to the low voltage level upon detection of the voltage level below the threshold voltage level Vth. The output voltage of the operational amplifier 57 is inverted at the inverter circuit 60, and the n-channel type field effect transistors 61 and 63 turn on with the low voltage level, however, the p-channel type field effect transistor 62 turns off to block a conduction path between the voltage level Vdd and the diode network. As a result, a conduction path is established from the reset pin of the microprocessor 12 through the diode 64 and the n-channel type field effect transistor 63 to the voltage line Vss. This results in that the reset signal of the active low voltage level is supplied to the reset pin of the microprocessor 12. With the reset signal of the active low voltage level, the microprocessor 12 is branched to an interruptive subroutine program illustrated in FIG. 8. Namely, when the reset signal is supplied to the microprocessor 12, the microprocessor 12 executes the initialization program routine and, accordingly, no data processing program routine. The microprocessor 12 further shifts the input and output pins RXD and TXD into the high-impedance states, respectively. The reset signal is further supplied to the frequency divider 17 for shifting into the inactive state, so that only the space impulses are transferred to the inductor 9 even if the microprocessor 12 retards the output buffer circuit to shift into the high-impedance state as by step P21. The microprocessor 12 proceeds to step P22 and periodically checks on the reset pin to see whether or not the reset signal is recovered to the inactive high voltage level. If the answer to the decision step P22 is given in the negative, the microprocessor 12 repeats the decision step P22 until the answer is changed, and no data processing program is executed by the microprocessor. This results in that no piece of data information is produced on the basis of error data bits by the microprocessor and, accordingly, memorized into the $E^2PROM$ 13. After a certain period of time, if the reset signal is recovered to the inactive high voltage level at time t3, the answer to the decision step P22 is given in the positive, so that the microprocessor 12 requests the terminal unit 52 to resend the bit string representative of the piece of input data information as by step P23. After the production of the request, the microprocessor 12 returns to the data processing program.

By virtue of the reset signal producing circuit 53, no piece of data information is produced on the basis of the error bits due to the turbulence. The turbulence by way of example takes place due to a mechanical vibration applied to the information card after the insertion. The information card shown in FIG. 5 is not of the bi-directional type, however, the reseting signal producing circuit 53 is applicable to the information card shown in FIG. 2.

Third embodiment

Turing to FIG. 9 of the drawings, still another information card system is illustrated and largely comprises an information card 71 and a terminal unit 72. The information card 71 is similar in circuit arrangement to the information card illustrated in FIG. 5, and, for this reason, the component circuits are denoted by like reference numerals designating the corresponding circuits of the information card 51 without any description. The terminal unit 72 is also similar to the terminal unit 52 with the exception of a combined circuit 73, and, for this reason, description is focused upon the combined circuit 73. The combined circuit 73 comprises a low-pass filter circuit 74, an amplifier circuit 75, a bit-string reproducing circuit 76 and a carrier detecting circuit 77. In this instance, the bit-string reproducing circuit 76 is formed by a frequency-to-voltage converter circuit. Reference numeral 78 designates a sensor for detecting the information card 71 upon insertion.

Description is hereinunder made for operation with reference to FIGS. 10 and 11. When the terminal unit 72 is activated, the data processing unit 21 checks on the sensor 78 to see whether or not the information card 71 is inserted into the terminal unit 71 as by step P31. During no information card is inserted into the terminal unit 72, the answer to the decision step P31 is given in the negative, so that the data processing unit 21 repeats the decision step P31 until the information card 71 is inserted into the terminal unit 72. When the information card 71 is inserted into the terminal unit 72, the sensor 78 reports the insertion to the data processing unit 21. With the report from the sensor 78, the answer to the decision step P31 is given in the positive, so that the data processing unit 21 proceed to step P32 to check on the reset pin to see whether or not a detecting signal is supplied thereto. The data processing unit 21 then allows the data output pin TXD2 to go down to the low voltage level. With the low voltage level at the data output pin TXD2, the series combination produces the power periodical signal CL which is transferred from the indicator 24 to the inductor 10. When the power periodical signal C1 is supplied to the periodical signal retrieving circuit 14, the pulse train is retrieved from the power periodical signal CL, and, the pulse trains is doubled in pulse width through the frequency divider 19. Since the microprocessor 12 executes the initialization program routine, no bit string is supplied to the data output pin TXD of the microprocessor 12, and, for this reason, the data selector 18 is transparent to the mark impulses MARK. This results in that the acknowledge signal AK is transferred from the inductor 9 to the inductor 25.

When the low-pass filter circuit 74 receives the acknowledge signal AK, undesirable spikes are eliminated from the acknowledge signal AK, and the acknowledge signal AK thus shaped is supplied in parallel to the amplifier circuit 75 and the carrier detection circuit 77 as will be seen from FIG. 11. In the initial stage of the insertion of the information card 71, the acknowledge signal AK is gradually increased in amplitude as a waveform W1. When the amplitude exceeds a threshold level established in the carrier detection circuit 77, the detection signal DT of the active high voltage level takes place and is, then, supplied to the ready pin READY of the data processing unit 21.

However, if the data communication is established between the information card 71 and the terminal unit 72, the data output signal OUT is supplied from the inductor 25 to the low-pass filter circuit 74. The data output signal OUT is shaped by the low-pass filter circuit 74 and, then, amplified in magnitude. The data output signal OUT in turn is supplied to the bit string reproducing circuit 76, and the mark impulses MARK and the space impulses SPACE are converted into the bit string STR identical with that produced in the microprocessor 12.

When the data processing unit 21 finds that the detecting signal DT is supplied to the data processing unit 21, the answer to the decision step P32 is given in the positive, so that the data processing unit 21 proceeds to step P33. At the step P33, the data processing unit 21 establishes the data communication and, accordingly, supplies the data output pin TXD1 with a bit string representative of the input data information.

The information card system thus arranged is advantageous over the prior-art information card system in that the data communication is established after the receipt of the detection signal DT. This results in that the information card system is prohibited from the misfit between the inductors, because no acknowledge signal Ak is supplied from the inductor 9 to the inductor 25 upon the misfit.

The information card system shown in FIG. 9 is of the uni-directional type, however, the combined circuit 73 is applicable to the bi-directional type if the program routine is slightly modified for alternation between the data output pins TXD1 and TXD2. Moreover, if the inductors 8 to 10 and 23 to 25 are replaced with two sets of connectors, the terminal unit 72 can be applied to an information card of the physical contact type.

Although particular embodiment of the present invention have been shown and described, it will be obvious to those skilled in the art that various changes and modifications may be made without departing from the spirit and scope of the present invention. For example, the inductors may be symmetrically arranged with respect to the line 11b. In another implementation, since the inductors are symmetrically arranged with respect to the center plane in the direction of the thickness, the information card is reversible.

What is claimed is:

1. An information card system comprising:
   a) an information card having
      a-1) at least first, second and third inductors respectively assigned to an input signal, a periodical signal and an output signal,
      a-2) a first data processing unit operative to execute program sequences for producing a plurality of output data signals after an initialization,
      a-3) a non-volatile memory unit associated with said first data processing unit and operative to memorize pieces of data information each represented by one of said output data signals,
      a-4) a first demodulation unit coupled between said first inductor and said first data processing unit and operative to extract a bit string indicative of a piece of input data information from said input signal,
      a-5) a separation unit coupled between said second inductor and said first data processing unit and operative to extract a pulse train from said periodical signal and to produce an electric power on the basis of said periodical signal, and
      a-6) an output unit coupled at an input node thereof to said separation unit and at an control node thereof to said first data processing unit and producing a data output signal in the presence of another output data signal fed from the first data processing unit, said output unit further producing an acknowledge signal in said initialization for transferring to said third inductor as said output signal; and
   b) a terminal unit communicable with said information card having
      b-1) at least fourth, fifth and sixth inductors capable of respectively facing said first, second and third inductors or said third, second and first inductors in a contactless fashion,
      b-2) a second data processing unit,
      b-3) two series combination circuits coupled in parallel between said second data processing unit and said fourth and sixth inductors, each combination circuit operative to produce said input signal or said periodical signal depending upon a job assignment decided by said second data processing unit, and
      b-4) a combined unit coupled between said fifth inductor and said second data processing unit and operative to relay said output signal to said second data processor and to produce a detection signal indicative of whether or not said acknowledge signal is supplied thereto, wherein said second data processing unit allows one of said two series combination circuits to produce said input signal after receiving said detecting signal indicative of a presence of said acknowledge signal.

2. An information card system as set forth in claim 1, in which said job assignment is previously fixed by said second data processing unit.

3. An information card system as set forth in claim 1, in which said job assignment is changeable between said two series combination circuits and decided after the receipt of said detecting signal.

4. An information card system as set forth in claim 3, in which said non-volatile memory unit is formed by an electrically erasable and programmable read only memory device.

5. An information card system as set forth in claim 4, in which said separation unit comprises a combination of a rectifier circuit coupled to said second inductor and a smoothing circuit coupled between the rectifier circuit and said first data processing unit, and a periodical signal retrieving circuit coupled to said second inductor.

6. An information card system as set forth in claim 5, in which said output unit comprises a first frequency divider coupled to said periodical signal retrieving circuit for producing space impulses, a second frequency divider coupled to the first frequency divider for producing mark impulses, and a data selector coupled at the input nodes thereof to said first and second frequency dividers and at the control node thereof to said first data processing unit for selectively transferring said space impulses and said mark impulses, thereby providing said data output signal or said acknowledge signal to said third inductor.

7. An information card system as set forth in claim 6, in which said output unit further comprises a reset signal producing circuit coupled to said smoothing circuit and operative to produce a reset signal shifted to an active level for a predetermined time period upon a power on event, wherein said first data processing unit execute an initialization program sequence in response to said reset signal for said initialization.

8. An information card system as set forth in claim 7, in which said reset signal producing circuit is further coupled to said second frequency divider and in which said second frequency divider is deactivated in the presence of said reset signal.

9. An information card system as set forth in claim 3, in which each of said two series combinations is associated with a oscillator for producing a periodical signal and comprises an inverter circuit coupled to said second data processing unit, an AND gate coupled at one input node thereof to the oscillator and at the other input node thereof to the inverter circuit, and a feedback loop coupled between the AND gate and each of said fourth and sixth inductors.

10. An information card system as set forth in claim 9, in which said second data processing unit provides a constant low voltage level and a bit string representative of said piece of input data information to said two series combinations, respectively, in accordance with said job assignment.

11. An information card system as set forth in claim 9, in which said combined unit comprises a series combination of a low-pass filter circuit, an amplifier circuit, a low-pass filter circuit, a demodulation circuit and a low-pass filter circuit for providing a signal propagation path of said data output signal between said fifth inductor and said second data processing unit, and a detector circuit coupled between the amplifier circuit and the second data processing unit and operative to produce a detection signal in the presence of said acknowledge signal.

12. An information card system as set forth in claim 8, in which said reset signal producing circuit comprises a voltage fluctuation detector coupled to said smoothing circuit operative to detect a fluctuation in voltage level and producing a detecting signal indicative of a fluctuation greater than a predetermined level, and a reset signal generator responsive to the detecting signal and producing said reset signal.

13. An information card system as set forth in claim 12, in which said voltage fluctuation detector has an operational amplifier with two input nodes, a reference voltage source coupled to one of the input nodes of the operational amplifier, a voltage divider coupled between said smoothing circuit and a constant voltage source and having an intermediate node coupled to the other input node of the operational amplifier.

14. An information card system as set forth in claim 12, in which said reference voltage source and said voltage divider are respectively coupled to an inverted node and a non-inverted node of said operational amplifier and in which said operational amplifier is coupled at the output node thereof to an inverter circuit.

15. An information card system as set forth in claim 14, in which said reset signal generator has a complementary inverter circuit coupled between said smoothing circuit and said constant voltage source and gated by said inverter circuit.

16. An information card system as set forth in claim 15, in which said voltage divider has another intermediate node and in which said reset signal generator further has an n-channel type bypassing transistor coupled between aforesaid another intermediate node of said voltage divider and said constant voltage source and gated by said inverter circuit.

17. An information card system as set forth in claim 12, in which said reset signal producing circuit further has an absorber coupled to said smoothing circuit and operative to absorb a small fluctuation in voltage level.

18. An information card system as set forth in claim 12, in which said reset signal producing circuit further has a diode network preventing a reset pin of said first data processing unit from a small fluctuation in voltage level.

19. An information card associated with a terminal unit having at least fourth, fifth and sixth inductors, said fourth and sixth inductors assigned to an input signal and a periodical signal depending upon a job assignment decided by said terminal unit, said fifth inductor selectively supplied with an acknowledge signal and a data output signal, said terminal unit operative to produce the input signal or the periodical signal at either of said fourth or sixth inductors, and establishing a data communication for said input signal and said output data signal after a receipt of said acknowledge signal, said information card comprising a) at least first, second and third inductors capable of respectively facing said at least fourth, fifth and sixth inductors, or said at least sixth, fifth and fourth inductors and assigned to said input signal, said periodical signal and an output signal consisting of said acknowledge signal and said data output signal,
b) a first data processing unit operative to execute program sequences for producing a plurality of output data signals after an initialization,
c) a non-volatile memory unit associated with said first data processing unit and operative to memorize pieces of data information each represented by one of said output data signals,
d) a first demodulation unit coupled between said first inductor and said first data processing unit and operative to extract a bit string indicative of a piece of input data information from said input signal,
e) a separation unit coupled between said second inductor and said first data processing unit and operative to extract a pulse train from said periodical signal and to produce an electric power on the basis of the periodical signal, and
f) an output unit coupled at an input node thereof to said separation unit and at an control node thereof to said first data processing unit and producing a data output signal in the presence of another output data signal fed from the first data processing unit, said output unit further producing said acknowledge signal in said initialization for transferring to said third inductor as said output signal.

20. An information card as set forth in claim 19, in which said job assignment is previously fixed by said terminal unit.

21. An information card as set forth in claim 19, in which said job assignment is changeable between said two inductors and decided after the receipt of said acknowledge signal.

22. A terminal unit communicable with an information card having at least first, second and third inductors respectively assigned to an input signal, a periodical signal and an output signal, a first data processing unit operative to execute program sequences for producing a plurality of output data signals after an initialization, a non-volatile memory unit associated with said first data processing unit and operative to memorize pieces of data information each represented by one of said output data signals, a first demodulation unit coupled between said first inductor and said first data processing unit and operative to extract a bit string indicative of a piece of input data information from said input signal, a separation unit coupled between said second inductor and said first data processing unit and operative to extract a pulse train from said periodical signal and to produce an electric power on the basis of the periodical signal, an output unit coupled at an input node thereof to said separation unit and at an control node thereof to said first data processing unit and producing a data output signal in the presence of another output data signal fed from the first data processing unit, said output unit further producing an acknowledge signal in said initialization for transferring to said third inductor as said output signal, said terminal unit comprising:
a) at least fourth, fifth and sixth inductors capable of respectively facing said first, second and third inductors or said third, second and first inductors in a contactless fashion,
b) a second data processing unit,
c) two series combination circuits coupled in parallel between said second data processing unit and said fourth and sixth inductors, each combination circuit operative to produce said input signal or said periodical signal depending upon a job assignment decided by said second data processing unit, and
d) a combined unit coupled between said fifth inductor and said second data processing unit and operative to relay said output signal to said second data processor and to produce a detection signal indicative of whether or not said acknowledge signal is supplied thereto, wherein said second data processing unit allows one of said two series combination circuits to produce said input signal after receiving said detecting signal indicative of a presence of said acknowledge signal.

23. An information card system as set forth in claim 22, in which said job assignment is previously fixed by said second data processing unit.

24. An information card system as set forth in claim 22, in which said job assignment is changeable between said two series combination circuits and decided after the receipt of said detecting signal.

* * * * *